United States Patent [19]

Chamussy et al.

[11] Patent Number: 5,801,306

[45] Date of Patent: Sep. 1, 1998

[54] METHOD OF PROCESSING PRESSURE MEASUREMENTS IN A TIRE MONITORING SYSTEM

[75] Inventors: Jean-François Chamussy, Blois; Jean-Pierre Francois, Romagnat; André Meunier, Lempdes, all of France

[73] Assignee: Compagnie Générale Des Etablissements Michelin - Michelin & CIE, Clermont-Ferrand Cedex, France

[21] Appl. No.: 822,572

[22] Filed: Mar. 19, 1997

[30] Foreign Application Priority Data

Mar. 20, 1996 [FR] France ................................. 96 03568
Mar. 20, 1996 [FR] France ................................. 96 03708

[51] Int. Cl.$^6$ ................................................ B60C 23/02
[52] U.S. Cl. .................. 73/146.2; 73/146.5; 340/442
[58] Field of Search ........................... 73/146.2, 146.3, 73/146.5, 146.8; 340/442, 443, 444, 445, 446, 447, 448, 449; 364/424.034, 558

[56] References Cited

U.S. PATENT DOCUMENTS

| 4,893,110 | 1/1990 | Hebert . | |
|---|---|---|---|
| 5,060,173 | 10/1991 | Tsuji | 73/146 |
| 5,252,946 | 10/1993 | Walker et al. | 340/444 |
| 5,517,853 | 5/1996 | Chamussy | 73/146.3 |
| 5,578,984 | 11/1996 | Nakajima | 340/444 |
| 5,583,483 | 12/1996 | Baumann | 340/444 |
| 5,614,882 | 3/1997 | Latarnik et al. | 340/444 |

FOREIGN PATENT DOCUMENTS 2680136  2/1993  France .

*Primary Examiner*—Ronald L. Biegel
*Assistant Examiner*—Paul D. Amrozowicz
*Attorney, Agent, or Firm*—Baker & Botts, L.L.P.

[57] ABSTRACT

A method of processing signals in a system for monitoring the tires of a vehicle, in which it is determined whether there is a clearly under-inflated or over-inflated tire as compared with the other tires of the vehicle and the driver is alerted only when the other tires show a homogeneous dispersion of their inflation pressures.

5 Claims, 1 Drawing Sheet

METHOD OF PROCESSING PRESSURE MEASUREMENTS IN A TIRE MONITORING SYSTEM

BACKGROUND OF THE INVENTION

The present invention relates to systems for monitoring tires. More particularly, it concerns the use of such systems in order to detect situations in which there is a potential risk of trouble although all the inflation pressures are within authorized ranges.

The monitoring systems must have as their object to see to it that all of the tires of a vehicle are used under the conditions of use for which these tires have been intended.

In fact, these systems conventionally verify that the inflation pressure of each of the tires of a vehicle does not drop below a threshold value which is about 10 to 15% below the nominal cold inflation pressure.

This verification, however, does not guarantee the detection of certain abnormalities of the state of inflation of the tires of a vehicle.

SUMMARY OF THE INVENTION

One example of an abnormal situation is when one tire is clearly under-inflated with respect to all of the others. This may be due to a very slow leak which has not yet been detected or it may be the result of work on the tire which has not been followed by correct reinflation.

The object of the invention is a method of processing signals of a system for the monitoring of tires of vehicles which makes it possible to detect a tire the state of inflation of which differs substantially from that of all the other tires of the vehicle, without bringing about numerous false alarms.

The method of the invention is such that, after having verified the cold state of the tires:

for each tire, the inflation pressure is measured and the deviation between the measured inflation pressure and the nominal pressure is calculated;

the tire of the vehicle, the deviation of which from the algebraic value is the lowest, is identified and this tire is called "the most under-inflated tire";

for all the tires of the vehicle, with the exception of the most under-inflated tire, a characteristic value of the dispersion of said deviations between the measured inflation pressures and the nominal pressures is calculated and this characteristic value is compared with a first given threshold;

if the characteristic value of the dispersion of said deviations is less than the first threshold, then the difference between the measured inflation pressure and the nominal pressure of said tire is calculated for the most under-inflated tire, as well as the average of said deviations of the other tires and said difference is compared with a second given threshold;

if said difference is greater than said second threshold, an alarm is sounded.

This method is used also to determine whether there is a tire which is clearly over-inflated as compared with the other tires. This second test is useful in order, for instance, to detect that an emergency wheel has been placed in use without its inflation pressure being reduced to a correct value.

DESCRIPTION OF PREFERRED EMBODIMENTS

Figure 1:
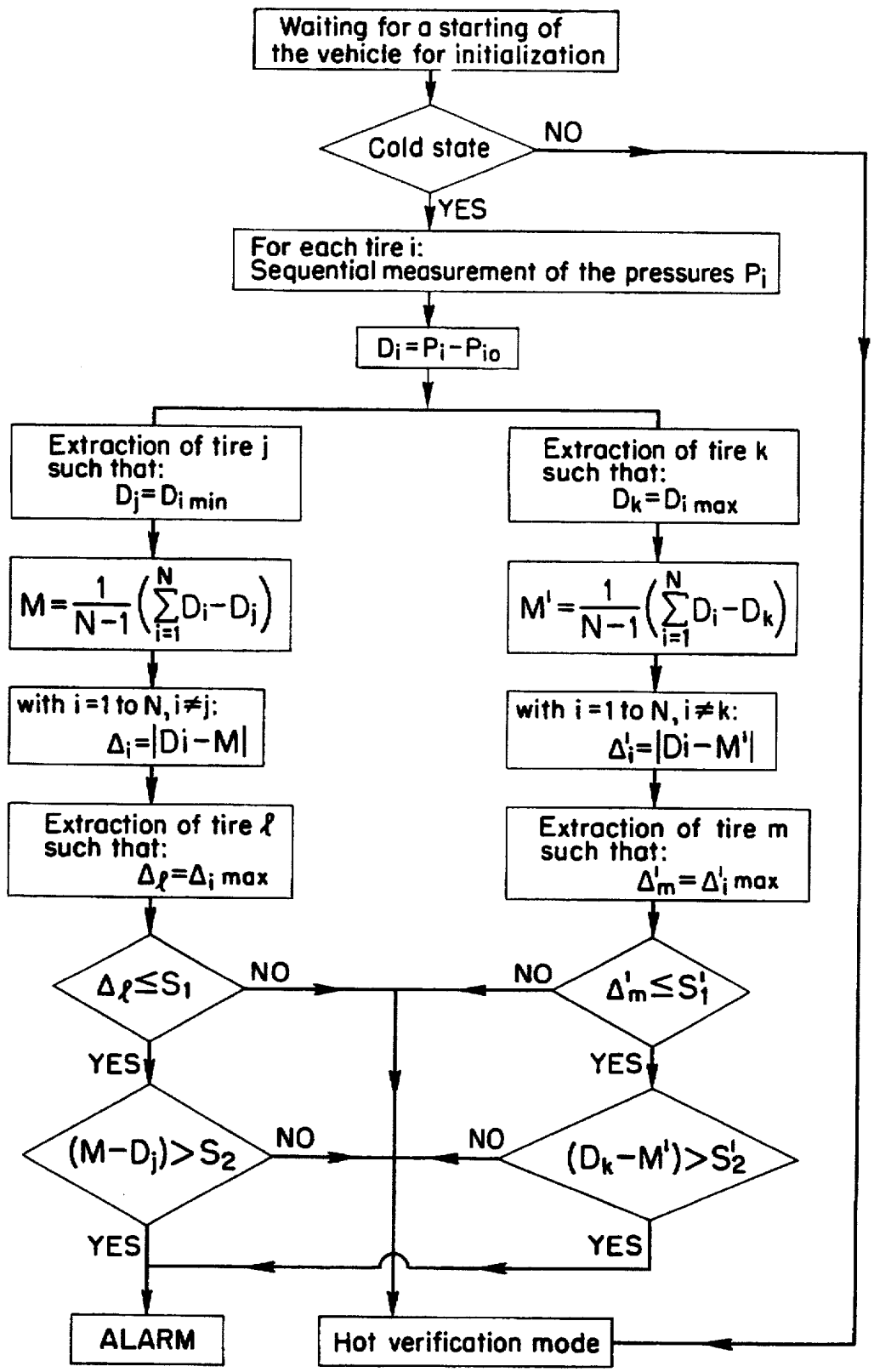
FIG. 1 is a flow chart which illustrates the method of the present invention.

In order to carry out the method of the invention, use may be made of a monitoring device, such as is disclosed in U.S. Pat. No. 4,703,650, having an electronic measuring module for each wheel which, by inductive coupling, transmits measurement signals to a central unit arranged in the vehicle and which, in turn, is connected to an indicating device in the vicinity of the driver. One can also use a device which transmits the same information by radio to a similar central unit. The electronic wheel modules measure at least the inflation pressure of the tire to which they are applied. They may also measure an estimate of the temperature of the air within the tire.

The method of the invention is intended for use preferably upon each starting of the vehicle when the tires are cold, that is to say, they are in thermal equilibrium with the surrounding air. The first step is thus to detect the hot or cold state of the tires. This verification can be effected, as proposed in French Patent 2,680,136, by comparing the deviations in measured temperatures between the internal temperatures of each tire and a measurement of the ambient temperature present within the vehicle. When these temperature measurements are not available, one can also verify that the time for which the vehicle has been stopped is greater than a minimum time on the order of 90 minutes for passenger cars or 4 hours for heavy vehicles. One can also modify this cooling time as a function of the previous use of the vehicle which has been memorized.

If this verification concludes that the tires are in hot state, switching is immediately effected to a so-called hot verification mode. This hot-verification of the tires advantageously comprises comparisons of the inflation pressures, tire by tire, relative to the cold nominal pressures, the monitoring of the deviations between the tires on one and the same axle as well as the monitoring of the variation in time of the these deviations between tires of one and the same axle or of several axles.

If the initial verification concludes that the tires are in cold state, the inflation pressure of each tire is measured in sequence and the deviation between the measured inflation pressures and the nominal cold pressures is then calculated.

One thus obtains:

$$D_i = P_i - P_{io}$$

in which $P_i$ is the inflation pressure of the tire i and $P_{io}$ is the cold nominal pressure of the same tire i. It is to be noted that it is entirely possible that the nominal pressures differ between several tires, particularly between tires on different axles. Therefore, cases can be observed in which the least inflated tire is properly inflated while another tire of higher inflation pressure is under-inflated relative to its nominal pressure.

From all of the values $D_i$ there is then algebraically extracted the minimum value which corresponds to the most under-inflated tire of the vehicle. This tire is called tire j. One has:

$$D_j = D_i \text{ min.}$$

The dispersion of the deviations for all the other tires is then analyzed. This analysis can be effected by calculating the average of the differences M:

$$M = \frac{1}{N-1} \left( \sum_{i=1}^{N} D_i - D_j \right)$$

in which N is the total number of tires provided with a pressure-measuring device and actually monitored.

The difference $\Delta_i$ is then calculated for each tire in the manner that:

$$\Delta_i = |D_i - M|$$

and one compares the maximum value of $\Delta_i$ relative to a first threshold S. The maximum value of $\Delta_i$ is that of the tire 1 (different from the tire j) the inflation pressure of which is furthest away from the average of the deviations M.

If this maximum value $\Delta$ is less than the threshold S, this means that all of the other tires of the vehicle have uniform, only slightly dispersed, inflation pressure values.

On the other hand, if this maximum value is greater than the threshold S, this indicates that the inflation pressure values of the other tires of the vehicle are too disperse for the test to be significant and a switch is made to the hot monitoring mode, after having possibly alerted the driver to this situation.

After having verified that the pressures are only slightly dispersed, the difference is then compared between the deviation $D_j$ and the average M relative to a second threshold $S_2$, namely:

$$(M-D_j) > S_2.$$

And if this difference proves to be greater than the threshold $S_2$, this means that the tire j is significantly more under-inflated than all the other tires of the vehicle.

This situation is abnormal since the vehicle, which can be presumed to be well maintained if one refers to the deviations found for all the other tires, has a tire which is significantly under-inflated relative to the others. Negligence on the part of the owner of the vehicle is probably not concerned here, but rather an abnormality in the tire in question, which may be due to a very slow leak not yet detected or to some work which was not followed by a correct verification of the inflation pressure of the tire.

It is therefore desirable to indicate to the driver that this tire j has a potential abnormality of inflation and to advise him to have it checked.

Typically, in the case of heavy vehicles with nominal inflation pressures on the order of 8 bar, the customary values of the critical alert threshold are on the order of 1 bar. When all the pressures are greater than the nominal pressure less 1 bar, no alarm is usually transmitted.

In the case of these heavy vehicles, one can select for the thresholds $S_1$ a value of about 400 mbar and for the threshold S2 a value of about 800 mbar. This shows that this test can disclose an abnormal situation at an early time in the case of a slow leak.

FIG. 1 also illustrates a similar test concerning the identification of the tire which is most over-inflated with respect to the others. This identification is, in particular, of interest in order to detect the case in which an emergency wheel, normally over-inflated, has been placed in use without having its inflation pressure corrected.

We claim:

1. A method of monitoring signals in a system for the monitoring of the tires of a vehicle, said system delivering for each tire at least one measurement of the inflation pressure of said tire, in which, after having verified the cold state of the tires:

for each tire, the inflation pressure is measured and the deviation between the measured inflation pressure and the nominal pressure is calculated;

the tire of the vehicle, the deviation of which from the algebraic value is the lowest, is identified and this tire is called "the most under-inflated tire";

for all the tires of the vehicle, with the exception of the most under-inflated tire, a characteristic value of the dispersion of said deviations between the measured inflation pressures and the nominal pressures is calculated and this characteristic value is compared with a first given threshold;

if the characteristic value of the dispersion of said deviations is less than the first threshold, then the difference between said deviation between the measured inflation pressure and the nominal pressure of said tire and the average of said deviations of the other tires is calculated for the most under-inflated tire and said difference is compared with a second given threshold;

if said difference is greater than said second threshold, an alarm is sounded.

2. A method of processing signals in a system for the monitoring of the tires of a vehicle, said system delivering for each tire at least one measurement of the inflation pressure of said tire, in which, after having verified the cold state of the tires:

for each tire, the inflation pressure is measured and the deviation between the measured inflation pressure and the nominal pressure is calculated;

the tire of the vehicle, the deviation of which from the algebraic value is the largest, is identified and this tire is called "the most over-inflated tire";

for all the tires of the vehicle, with the exception of the most over-inflated tire, a characteristic value of the dispersion of said deviations between the measured inflation pressures and the nominal pressures is calculated and this characteristic value is compared with a first given threshold;

if the characteristic value of the dispersion of said deviations is less than the first threshold, then the difference between the average of said deviations of the other tires and said deviation between the measured inflation pressure and the nominal pressure of said tire is calculated for the most over-inflated tire said difference is compared with a second given threshold;

if said difference is greater than said second threshold, an alarm is sounded.

3. A method according to either of claims 1 and 2, in which, considering all the tires with the exception of the most under-inflated or most over-inflated tire:

the algebraic average of the deviations between the inflation pressures and the rates pressures is calculated;

for each tire, the difference between the deviation between the inflation pressure and the nominal pressure of said tire and said algebraic average is calculated;

said difference, the absolute value of which is the greatest, is taken as characteristic value of the dispersion of said deviations.

4. A method according to claim 1, in which a hot monitoring mode is switched to at the end of the cold monitoring.

5. A method according to claim 1 or 2 in which the characteristic value is the difference between the maximum deviation of the measured inflation pressures and the average of the deviations.

* * * * *

UNITED STATES PATENT AND TRADEMARK OFFICE
CERTIFICATE OF CORRECTION

PATENT NO. : 5,801,306

DATED : September 1, 1998

INVENTOR(S) : Chamussy et al.

It is certified that error appears in the above-identified patent and that said Letters Patent is hereby corrected as shown below:

Col. 4, line 60: "claim 1," should read --claim 1 or 2,--;

Col. 3, line 12: "tire 1" (tire one) should read --tire 1-- (tire letter "l");

Col. 3, line 15: "value $\Delta$" should read --value $\Delta_l$--;

Col. 3, line 53: "threshold S2" should read --threshold $S_2$--.

Signed and Sealed this

Seventh Day of December, 1999

Attest:

Q. TODD DICKINSON

*Attesting Officer*  *Acting Commissioner of Patents and Trademarks*